United States Patent [19]

Boode-Boissevain et al.

[11] Patent Number: 5,480,662
[45] Date of Patent: Jan. 2, 1996

[54] FAT-REDUCED LAMINATED DOUGHS

[75] Inventors: Karin Boode-Boissevain, Gorichem; Jeannette D. Van Houdt-Moree, Gouda, both of Netherlands

[73] Assignee: Van den Bergh Foods Co., Division of Conopco, Inc., Lisle, Ill.

[21] Appl. No.: 217,521

[22] Filed: Mar. 24, 1994

[30] Foreign Application Priority Data

Mar. 25, 1993 [EP] European Pat. Off. .............. 932861

[51] Int. Cl.$^6$ .................................................. A21D 2/00
[52] U.S. Cl. ............................ 426/94; 426/556; 426/804
[58] Field of Search ............................. 426/94, 556, 804

[56] References Cited

U.S. PATENT DOCUMENTS

| | | | |
|---|---|---|---|
| 4,510,166 | 4/1985 | Lenchin et al. | 426/603 |
| 4,536,408 | 8/1985 | Morehouse et al. | 426/603 |
| 4,622,226 | 11/1986 | Takeuchi | 427/327 |
| 5,082,673 | 1/1992 | Inglett | 426/21 |
| 5,094,872 | 3/1992 | Furcsik et al. | 426/578 |
| 5,133,984 | 7/1992 | Murphy et al. | 426/556 |

FOREIGN PATENT DOCUMENTS

| | | |
|---|---|---|
| 529892 | 3/1993 | European Pat. Off. . |
| 93/00829 | 1/1993 | WIPO . |

OTHER PUBLICATIONS

European Search Report in priority case 93 2200861.8 dated Aug. 27, 1993.
International Search Report in PCT EP 94/00698.
*Food Technology*, V. 38, No. 1, Jan. 1984, pp. 114–117, Hoseney, "*Functional properties of pentosans in baked foods,*".

*Primary Examiner*—Jeanette Hunter
*Attorney, Agent, or Firm*—Gerard J. McGowan, Jr.

[57] ABSTRACT

The invention concerns laminated doughs, wherein an aqueous gel containing 20–50 wt. % of maltodextrin and 0–30 wt. % of β-glucan and/or pentosans is present as fat replacer; in this way, doughs can be made that contain less than 14 wt. % of fat so that a fat reduction (compared with a conventional dough) of at least 50% can be obtained.

12 Claims, No Drawings

FAT-REDUCED LAMINATED DOUGHS

Laminated dough systems, i.e. systems comprising subsequent layers of dough and layers of another ingredient, in fact of a bakery, laminating margarine or shortening, have been known for years. For example, doughs suitable for the production of puff pastries, croissants, Danish pastries, snacks etc. are laminated doughs wherein, in general, 30 to 70 wt. % of total fat based on product is present in the form of thin fat layers (in general 4 to 729 fat layer are present) and wherein each fat layer is present between two dough layers.

The fat had to be present in order to give the baked product satisfactory product properties, such as a good texture, a good structure, a good appearance, a good mouthfeel, a good lift, a good specific volume and/or a good ovenspring. However, the fat content of acceptable products was still rather high (at least 15 wt. %).

In the increasing tendency towards healthier food products, there exists a great demand for fat-reduced laminated doughs. As a reduction of the fat content of the products mentioned above is impossible without adversely affecting the product properties, it was necessary to replace part or all of the fat by a product that has fat-replacing properties. Although many different fat replacers are known nowadays, we found that good fat-reduced laminated doughs can only be obtained (resulting in very satisfactory products upon baking) by applying a very specific fat-replacing composition.

The requirements that should be met by the fat-replacing composition are:
they should have rolling-out properties since lamination must be possible. For this reason, protein-based fat replacers cannot be applied;
they should have a fatty impression (poorly met by, e.g., protein-based materials);
they should have no off taste (excluding again most protein-based materials);
they should preferably be natural (excluding all synthetic fat replacers);
they should not give rise to anneal leakage problems, as disclosed for most sucrose poly fatty acid esters;
it should be possible to produce a fat-replacing product therefrom having rheological properties that make the product suitable for lamination purposes. The rheological properties of the fat replacer should not be too different from those of the dough or it will be impossible to obtain a satisfactory laminated structure.

According to our Australian Patent 604,244 puff pastries can be made from flour, water and fat compositions, whereby the fat compositions applied for the lamination contain vegetable fibre material in a weight ratio of 1:1 to 20:1 (fat:fibre). The fibre material is a vegetable fibre material that has not, or only slightly, been modified and is therefore water-insoluble. Though it can be calculated from the data mentioned in this document that, theoretically, a 60% fat reduction could be achieved, the examples only illustrate fat reductions of about 35%.

We have performed a study in order to find out how fat reductions of at least 50%, preferably at least 60%, could be achieved without interfering with the product properties. This study has resulted in our invention, according to which the above-mentioned problems could be overcome by applying an aqueous gel containing 20–50 wt. % of maltodextrin, preferably amylodextrin and 0–30 wt. % of β-glucan and/or pentosans, balance water, as a fat-replacing composition in laminated doughs. It should be understood that amylodextrin is a maltodextrin derived from starch.

Therefore, our invention concerns laminated doughs comprising subsequent layers of dough and layers of another ingredient, wherein at least part of the layers of the other ingredient, at least partly, consists of an aqueous gel containing 20–50 wt. % of maltodextrin, preferably amylodextrin and 0–30 wt. % of β-glucan and/or pentosans, balance water.

The aqueous gel preferably contains 20–50 wt. % of the maltodextrin and 0.001–30 wt. % of β-glucan and/or pentosans.

Although the weight ratio β-glucan: pentosans in the aqueous gel can vary such that only β-glucan or only pentosans are present, we prefer the use of aqueous gels wherein this weight ratio ranges from 1.5 to 5:1.

Aqueous gels that can be applied very satisfactorily are obtained by the gelling in water of a product containing maltodextrin and β-glucan and/or pentosans as obtainable by hydrolyzing cereal flour or a blend of cereal flour and starch with α-amylase and recovering the soluble fraction. Such products and techniques are, e.g., disclosed in U.S. Pat. No. 5,082,673. Although this patent mentions the use of these products for bakery purposes, nothing is exemplified on this application while the US patent remains silent about the very specific application of these products in laminated doughs.

The aqueous gel is normally applied in amounts of 30–80 wt. %, based on the dough. This applies in particular when all the layers of the other ingredient consist of the aqueous gel.

The maltodextrin present in the aqueous gel preferably has a DE value of 20 or less; in particular DE values of 2–8 are applied.

The aqueous gel can either be applied per se or as a mixture with a bakery margarine. When a mixture is applied, the weight ratio margarine: aqueous gel can vary from 20:80 to 80:20.

It has further been found that the aqueous gels can be applied in combination with spreads (= "margarines" containing less fat) having a fat content of 60 wt. % or less, preferably 40–60 wt. %. The resulting products have therefore even lower fat contents while their properties remain satisfactory.

It is possible to replace all of the fat in the laminated dough, in particular when croissant doughs are made. It is also possible, for replacement of part of the laminate-dough fat, to apply the blend of margarine and aqueous gel mentioned above. This blend can replace part or all of the fat of the non-dough layers.

It is, of course, also possible to replace all of the fat in only part of the non-dough layers by the aqueous gel. In that case, the fat and the aqueous gel are added in different steps of the lamination procedure. A process wherein more than one addition step of the fat component is disclosed, is, e.g., the subject of our EP Application 90200502.4. This procedure also provides the possibility of producing laminated dough products wherein the fat layers and the layers of fat replacer have different thicknesses. In one embodiment, the laminated croissant doughs according to our invention have separate layers of margarine and of the aqueous gel of maltodextrin and optionally β-glucan and/or pentosans, wherein the thickness of the aqueous gel layers is at least 3 times the thickness of the margarine layers.

Application of the aqueous gel in the laminated doughs according to the invention can result in products wherein less than 14 wt. % of a triglyceride composition is present. In such products at least 50 wt. % of the amount of fat present in a conventional dough is replaced by the aqueous gel of maltodextrin, and optionally β-glucan and/or pentosans.

As will be obvious from the above, the doughs can be unleavened (= puff pastry dough or laminated snack dough) or leavened (croissant-type doughs).

The doughs can also be frozen; this can be done either without, or in addition to, pre-proofing of the dough.

Freezing after pre-proofing results in a convenience dough in the form of a frozen, pre-proofed dough. Such a dough can be baked without thawing.

The above-mentioned laminated doughs can also be applied for the production of savoury snacks or laminated sweet snacks. For the production of savoury snacks the dough is either provided with an amount of, e.g., bacon or cheese, or is flavoured with flavours imparting a bacon or cheese flavour to the products. The sweet snacks are obtained by providing the laminated dough with a sugar layer and/or a cinnamon layer.

Baked products, such as puff pastries, croissants, savoury snacks or sweet snacks, which are obtained after baking of the laminated doughs according to the invention, are also part of the invention.

EXAMPLES

1. Preparation of puff pastry

Puff pastries were prepared, using the following recipes:

|  | Prior art | Invention |
| --- | --- | --- |
| Predough |  |  |
| Flour | 1000 g | 1000 g |
| Water | 540 g | 540 g |
| Fat | 200 g* | 0 g |
| Laminate |  |  |
| Roll-in fat | 800 g* | 400 g |
| Fat replacer | — | 400 g |

*Triokorst ® (Van Den Bergh Foods) : 80% fat content
**A 50% fat spread
***Aqueous gel containing:
27.3 wt. % of amylodextrin
1.9 wt. % of β-glucan
0.66 wt. % of pentosans?
balance water The prior art product was made by:
mixing and kneading of the pre-dough
resting for 10 minutes
rolling of the dough to a square
providing the dough with the roll-in fat
folding and laminating the composition as follows:
2×½ in 3
resting: 40 minutes
2×½ in 3
resting: 40 minutes
2×½ in 3
resting: 40 minutes
The products were baked at 235° C. for 20 minutes. The resulting puff pastry consisted of 729 layers, it had a lift of 36 mm, a reasonable structure and a good mouthfeel. Its fat on dough content was 31.5 wt. %.

The puff pastry according to the invention was made by:
mixing and kneading of the pre-dough
resting for 10 minutes
mixing of roll-in fat and fat replacer and shaping mixture to a square
rolling of the dough to a square
providing the dough with the shaped mix of fat and fat replacer
folding and laminating as follows:
2×½ in3
resting: 40 minutes
2×½ in3
resting: 40 minutes
The product was baked at 235° C. for 20 minutes.

The resulting puff pastry consisted of 81 layers, had a lift of 30 mm, an inner structure better than that of the prior art product and a slightly shorter mouthfeel than the prior art product. Its fat on dough content was 8.5% (fat reduction 73%).

2. Preparation of a croissant

The following recipes were applied:

|  | Prior art | Invention |
| --- | --- | --- |
| Predough |  |  |
| Flour | 1000 g | 1000 g |
| Water | 580 g | 580 g |
| Sugar | 30 g | 30 g |
| Salt | 20 g | 20 g |
| Bread improver | 30 g | 30 g |
| Yeast | 100 g | 100 g |
| Lamination |  |  |
| Roll-in fat | 60% on flour* | 25% on flour** |
| Fat replacer*** | — | 25% on flour |

*Triokorst ® (Van Den Bergh Foods) : 80% fat content
**A 50% fat spread
***Aqueous gel containing:
27.3 wt. % of amylodextrin
1.9 wt. % of β-glucan
0.66 wt. % of pentosans
balance water The prior art product was made by:
mixing and kneading of the pre-dough
resting for 10 minutes
rolling of dough to a square
providing the dough with roll-in fat
folding and laminating as follows:
2×½ in 4
the laminated dough was proofed for 60 minutes (32° C.; 85% R.H. )
The products were baked at 220° C. for 18 minutes.
The resulting croissant had 16 layers, contained 20.3 wt. % of fat on dough and had an S.V. (seed replacement method) = 10.

The products according to the invention were made by a similar method, applying instead a mix of fat and fat replacer and a folding and lamination method according to:
1×½ in 2
1×½ in 4
The product had 8 layers, contained 5.5 wt. % of fat on dough (= fat reduction: 73%) and displayed an S.V. = 7.6.

3. Preparation of puff-pastry

Example 1 was repeated, however, the pre-dough consisted of:

| flour | 1000 g |
| --- | --- |
| water | 540 g |
| vitamin C | 0.5 g |

-continued

| | |
|---|---|
| fat | 200* g |

For the lamination we used:

| | comparison | invention |
|---|---|---|
| roll-in fat | 800 g* | 600 g** |
| fat-replacer*** | — | 600 g |

*Triokorst ® (Van den Bergh Foods)
**50% fat spread
***aqueous gel. Different aqueous gels were applied, having the following compositions:

| aqueous gel | β-glucan (%) | pentosans (%) | maltodextrin % |
|---|---|---|---|
| 1 | 0 | 0 | 33 |
| 2 | 0 | 0.66 | 33 |
| 3 | 1.9 | 0.66 | 33 |
| 4 | 0 | 2.64 | 33 |

The puff-pastries obtained, displayed the following lift:

| aqueous gel | lift (mm) |
|---|---|
| 1 | 38.1 |
| 2 | 41.1 |
| 3 | 49.2 |
| 4 | 55.8 |

We claim:

1. A laminated dough comprising subsequent layers of dough and layers of an other ingredient,, wherein at least part of the layers of the other ingredient, at least partly, includes an aqueous gel, obtained by gelling in water of a product containing maltodextrin and β-glucan or maltodextrin and pentosans, or maltodextrin, β-glucan and pentosans, as obtained by hydrolysing cereal flour or a blend of cereal flour and starch with α-amylase and recovering of the water soluble fraction, so that the aqueous gel includes 20–50 wt. % of maltodextrin, and 0.001–30 wt. % of β-glucan or pentosans or β-glucan and pentosans, and water.

2. The laminated doughs according to claim 1, wherein the β-glucan: pentosan weight ratio in the aqueous gel ranges from 1:5 to 5:1.

3. The laminated doughs according to claim 1, wherein all the layers of the other ingredient comprise the aqueous gel, the weight ratio dough: total aqueous gel in the product ranging from 30:70 to 80:20.

4. The laminated doughs according to claim 1, wherein the maltodextrin has a DE value of 20 or less.

5. A puff pastry dough or laminated snack dough, comprising non-dough layers either comprising a blend of puff pastry margarine and the aqueous gel of maltodextrin and β-glucan and/or pentosans as defined in claim 1 or comprising separate layers of margarine and the aqueous gel of maltodextrin and β-glucan and/or pentosans, as defined in claim 1.

6. The puff pastry dough or laminated snack dough according to claim 5, wherein the weight ratio margarine: aqueous gel ranges from 20:80 to 80:20.

7. A laminated croissant dough, comprising non-dough layers comprising 1) a blend of margarine and the aqueous gel of maltodextrin, and β-glucan and/or pentosans, or 2) the aqueous gel of maltodextrin, and β-glucan and/or pentosans only, or 3) wherein separate layers of margarine and the aqueous gel of maltodextrin, and β-glucan and/or pentosans are present, wherein the aqueous gel is as defined in claim 1.

8. The laminated dough according to claim 5, wherein the margarine applied has a fat content of 40–60% wt. %.

9. Puff pastry dough, laminated croissant dough or laminated snack dough, made from the laminated dough according to claim 1, wherein less than 14 wt. % of a triglyceride composition is present.

10. Frozen laminated doughs, wherein the doughs according to claim 1 are deep-frozen, either without or in addition to preproofing of the dough.

11. Baked, laminated dough products obtained after baking of the laminated doughs according to claim 1.

12. The laminated dough of claim 1 wherein the maltodextrin comprises amylodextrin.

* * * * *